United States Patent
Lange et al.

(10) Patent No.: US 10,556,661 B2
(45) Date of Patent: Feb. 11, 2020

(54) ARRANGEMENT IN A VEHICLE CABIN HAVING A CABIN MONUMENT WITH TWO ACCESS OPENINGS AT TWO AISLES, WHICH FORM AN INTERSECTION

(71) Applicant: Airbus Operations GmbH, Hamburg (DE)

(72) Inventors: Roland Lange, Hamburg (DE); Andreas Heidtmann, Hamburg (DE)

(73) Assignee: AIRBUS OPERATION GMBH, Hamburg (DE)

( * ) Notice: Subject to any disclaimer, the term of this patent is extended or adjusted under 35 U.S.C. 154(b) by 313 days.

(21) Appl. No.: 15/449,037

(22) Filed: Mar. 3, 2017

(65) Prior Publication Data
US 2017/0253315 A1    Sep. 7, 2017

(30) Foreign Application Priority Data
Mar. 3, 2016    (DE) ..................... 10 2016 103 825.3

(51) Int. Cl.
*B64C 1/00*    (2006.01)
*B64C 1/06*    (2006.01)
(Continued)

(52) U.S. Cl.
CPC .............. *B64C 1/06* (2013.01); *B64C 1/1423* (2013.01); *B64C 1/18* (2013.01); *B64D 11/02* (2013.01); *B64D 11/04* (2013.01)

(58) Field of Classification Search
CPC ... B64C 1/1423; B64C 1/1469; B64C 1/1407; B64D 11/02; B64D 11/04;
(Continued)

(56) References Cited

U.S. PATENT DOCUMENTS 6,474,599 B1 *   11/2002   Stomski .............. B64C 1/1469
                                                        109/68
7,984,875 B2 *   7/2011    Koehn ................. B64C 1/1469
                                                        244/118.5
(Continued)

FOREIGN PATENT DOCUMENTS

DE    102011011704 A1    12/2012
EP    0850833 A2          7/1998
(Continued)

*Primary Examiner* — Richard G Davis
(74) *Attorney, Agent, or Firm* — Lorenz & Kopf LLP

(57) ABSTRACT

A vehicle cabin arrangement includes first and second intersecting aisles, a first walling of a cabin monument bordering the first aisle, and a second walling bordering the second aisle. The wallings extend from the floor region of the cabin to a ceiling region of the cabin, and form an angle less than 180°. A first access opening is arranged in the first walling and is closable through a first door, and a second access opening is arranged in the second walling and is closable with a second door. A door blocking unit has blocking means designed for preventing an access to the first access opening and the second access opening. The door blocking unit is switchable between at least two operating modes. In a first operating mode, only the first access opening is accessible. In a second operating mode, only the second access opening is accessible.

20 Claims, 8 Drawing Sheets

(51) Int. Cl.
*B64C 1/14* (2006.01)
*B64C 1/18* (2006.01)
*B64D 11/02* (2006.01)
*B64D 11/04* (2006.01)

(58) Field of Classification Search
CPC ............ B64D 11/0023; B64D 45/0015; B64D 2011/0046; B64D 2011/004611
See application file for complete search history.

(56) References Cited

U.S. PATENT DOCUMENTS

| | | | |
|---|---|---|---|
| 2002/0062521 A1 | 5/2002 | Itakura | |
| 2003/0006342 A1* | 1/2003 | Page, Jr. ................... | H04B 3/56 244/118.5 |
| 2003/0066931 A1* | 4/2003 | Ward .................... | B64C 1/1469 244/118.5 |
| 2005/0116098 A1* | 6/2005 | Martens ................ | B64C 1/1469 244/118.5 |
| 2009/0242699 A1 | 10/2009 | Wentland et al. | |
| 2012/0261509 A1* | 10/2012 | Grant ..................... | B64D 11/02 244/118.5 |
| 2013/0206907 A1* | 8/2013 | Burrows ................ | B64D 11/02 244/118.5 |

FOREIGN PATENT DOCUMENTS

| WO | 2013017290 A1 | 2/2013 |
|---|---|---|
| WO | 2013123075 A1 | 8/2013 |

\* cited by examiner

ARRANGEMENT IN A VEHICLE CABIN HAVING A CABIN MONUMENT WITH TWO ACCESS OPENINGS AT TWO AISLES, WHICH FORM AN INTERSECTION

CROSS-REFERENCE TO RELATED APPLICATION

This application claims the benefit of German patent application number DE 10 2016 103 825.3, filed Mar. 3, 2016.

TECHNICAL FIELD

Embodiments of the invention relate to an arrangement in a cabin of a vehicle having a cabin monument enclosing a space. The embodiments of the invention further relate to an aircraft, comprising an aircraft fuselage with a cabin formed therein, which comprises such an arrangement.

BACKGROUND

The equipping of passenger cabins of vehicles and in particular of commercial aircraft is subject to the requirement of a particularly high space efficiency, low manufacturing costs, a sufficient modularity and adaptability to individual design requirements of a vehicle operator, respectively, with a low number of different components at the same time. In particular, the space efficiency may be increased by enabling multiple uses of components and space regions. A purpose of the high space efficiency to be particularly emphasized lies in maximizing the number of accommodatable passenger seats in the respective cabin without limiting the comfort of passengers. For this purpose, cabin monuments are often improved in their composition, such that as many functions as possible are made available on a space as small as possible.

For achieving an improved functionality it is known to fit cabin monuments with modules of different kinds, which particularly include galley modules and toilet or lavatory modules. An improvement in the compactness of lavatories may inter alia be achieved through shaping outer walls to meets the demands and through exploitation of previously unused space regions in the lavatory. Furthermore, in certain operating states of the vehicle, regions that are not to be entered by passengers may be used for conducting required functions in these operating states. For example, WO 2013/017290 A1 shows an aircraft monument, which comprises a sanitary module having a sanitary equipment as well as a galley module adjacent to the sanitary module. The galley module includes a trolley parking space as well as a worktop. The trolley parking space is separated from the sanitary module through a partition wall.

BRIEF SUMMARY

An objective of the disclosed embodiments is to propose an alternate arrangement in a cabin of a vehicle, with which an improved, multifunctional design allowing for different operating states of the vehicle and a compacting are accomplished.

This objective is met by an arrangement in a cabin of a vehicle, which comprises a cabin monument that encloses a space, the arrangement having the features of the independent claim 1. Advantageous embodiments and further improvements may be gathered from the other claims and the following description.

An arrangement in a cabin of a vehicle is proposed, the arrangement comprising a first aisle formed on a cabin floor; a second aisle formed on the cabin floor creating an intersection with the first aisle; a first walling, which borders on the first aisle, of a cabin monument enclosing a space; and a second walling, which borders on the second aisle, connecting to the first aisle; the wallings extending from a region near a floor of the cabin in direction of a ceiling region of the cabin and enclosing an angle which is less than 180°; a first access opening arranged in the first walling and closable through a first door; a second access opening arranged in the second walling and closable with a second door; and a door blocking unit with blocking means, which each are designed for preventing an access to the first access opening and the second access opening. The "blocking means" can be any device, part, component, system, element, or apparatus that is designed to (or is configurable to) block or inhibit access to something. The door blocking unit is switchable between at least a first and a second operating mode. In the first operating mode, exclusively the first access opening is accessible and in the second operating mode, exclusively the second access opening is accessible.

In the context of an embodiment of the invention, the cabin monument is to be understood as a furnishing item, which is arranged on or directly above a floor in the cabin and provides a space through a closed arrangement of wallings, which may be a part of the cabin monument itself or may be associated with adjacent devices, which space may be entered by persons and be used according to the designated use. In particular, it suggests itself to provide a lavatory, a toilet or similar in the cabin monument. For an optimum exploitation of the space, the cabin monument may preferably extend from the floor over the whole available height, which is limited by the ceiling region with ceiling panels or similar installed there, in the cabin.

The type of construction of the wallings inter alia depends on the type of the vehicle and the intended purpose of the cabin monument. If the arrangement according to the invention is integrated into a cabin of an aircraft, the wallings should comprise a particularly low weight with a sufficient rigidity, which is ruled in certification regulations. Often, a sandwich material is used, which comprises two or more honeycomb core layers covered by two high tensile cover layers. The cover layers may be a fibre-reinforced plastics, e.g., GFRP or CFRP.

The first walling and the second walling are to be understood as surface-like components, which may be planar, as well as curved, bent or folded, depending on the designated installation location and the installation conditions that go therewith. The first walling and the second walling connect to each other in a manner, that they comprise end edges facing to each other, which are either directly connected to each other, are transitioning into each other, are merging into each other or are connected to each other by means of one or more further components placed therebetween. Through the enclosed angle that is below 180°, both wallings are not arranged parallel to each other, but form an edge or a kink with each other. Depending on the placement of the two wallings, the edge formed by both wallings may be an outer edge of the cabin monument. Particularly preferred, the first walling and the second walling enclose a right angle with each other; hence, the angle that is below 180° then equals 90°.

The access openings allow a person to enter the space enclosed by the cabin monument from the cabin, wherein the respective door may be operable both from exterior as well as from interior and, in particular, is closable. The door may be designed in a manner, that in a closed state it is positioned flushly in the access opening or that it rests flushly from exterior or from interior. A movement is allowed through the arrangement of the door at the respective walling through one or a plurality of hinges, wherein the hinges may exemplarily be simple hinges, concealed hinges or strap hinges, which preferably support the door around a vertical swivelling axis.

The first and the second aisle are to be understood as floor regions in the cabin, which may freely be entered and which pass the cabin monument for reaching the cabin monument or other regions, which are at a further distance from the cabin monument. Due to the limited available space often only relatively a few aisles are present in vehicles, which aisles often extend either parallelly or perpendicularly to a longitudinal axis of the vehicle. According to an embodiment of the invention, the first and the second aisle run along two wallings of the cabin monument and intersect or overlap, respectively, in the previously mentioned intersection, which borders on a corner or edge of the cabin monument or which is arranged nearby.

A special feature of the arrangement according to an embodiment of the invention is the door blocking unit, which is equipped with blocking means, which each are designed for preventing an access to the first access opening and the second access opening. Through switching between at least two operation modes, the respective cabin monument may fulfil different functions or function types depending on the respective operation mode.

In a first operation mode, entering the cabin monument through the first access opening is allowed, but prevented through the second access opening. Consequently, the cabin monument may be entered only from one direction, which corresponds to the first access opening and the first aisle. In the second operation mode, this is exactly opposite, such that the cabin monument may only be entered from the second aisle.

The first walling as well as the first access opening may face to a passenger cabin and passenger seats arranged therein, while the second walling and the second access opening arranged therein, which border the second aisle, face to an adjacent cabin monument or the such. The second aisle may at least partially be separable from the remaining part of the cabin in certain operation phases of the vehicle, such that through preventing the access through the second access opening by means of the respective blocking means, nobody may enter this region through the cabin monument.

However, through the door blocking unit it is also possible to allow the access exclusively from the second access opening, which in particular in aircraft cabins allows the crew to rest in a separate part of the second aisle without being disturbed or to enter the cabin monument from there. However, embodiments of the invention are not limited to such a constellation, in fact the access openings may also face into other regions of a passenger cabin.

The door blocking unit as well as the blocking means connected thereto are realizable through many different ways, which exploit purely mechanical, electrical, electromagnetical and other principles. A non-exhaustive amount exemplarily includes a mechanical bar construction, a bar construction with bars, which are movable by means of electromechanical or fluid based actuators, pawl/latch-constructions, which are electrically blockable or releasable, e.g. of the type of an electrical or digital cylinder lock, respectively, electro magnets, curtains, sliding doors, swivable or displaceable partition walls, movable barriers and the such used for blocking. All kinds of blocking means may be used for switching the operating mode through changing their state, e.g., through displacing a partition wall, through opening or closing a curtain or through moving a barrier.

Blocking devices, systems, or other means, which are operated with electrical, electromagnetical or fluid based actuators or are realized as such, are preferably connected with a control unit for this purpose, which control unit conducts a switching between the operation modes through a respective triggering. Preventing the access through a respective access opening may consequently be accomplished through blocking the respective door or through separating the respective aisle to the respective access opening.

Altogether, an arrangement may be realized herewith, that helps a cabin monument to provide at least one additional function or type of operation, respectively, and neither restricts the comfort of the passengers nor of the crew of the vehicle.

In an advantageous embodiment, at least one of the blocking means is engageable with at least one component of each door. A blocking means may thereby directly act upon an associated door in order to hold it mechanically, i.e., to prevent the motion of the door in a closed position. One or a plurality of other blocking means does not necessarily need to be designed equally, in fact also a combination of a blocking means directly acting upon a component of a door and other blocking means that do not directly act upon a component of the door is conceivable, such as a curtain or a barrier that extend in front of a door or an associated aisle. A blocking means engageable with at least one component may include any type of bars, pawls, latches or the such, which are engageable with a corresponding element in order to conduct a blocking of the door there. Through acting upon at least one component of the first door and the second door, an operation of the first door or the second door is counteracted.

In an advantageous embodiment, the first walling and the second walling form a common outer edge that extends into the cabin. Edges of the first walling and the second walling, that face each other, merge into each other or are connected directly to each other or through an edge bracket or another type of edge protection or an edge rail. The common intersection of the first and the second aisle may directly border on the outer edge. An access into the cabin monument may be accomplished at a crossing between a longitudinal and a transversal aisle in a cabin.

The first door and the second door may each be swivably supported around a swivelling axis, which is vertical to a floor of the cabin, at opposed sides. In particular in space efficiently designed passenger cabins, this is advantageous, as only the sides of the doors facing to the outer edge may be moved by a user, while door regions facing away from the outer edge may also be arranged in somewhat constricted installation spaces, in which a particularly comfortable accessibility for a person is not necessary.

In a particularly advantageous embodiment, the door blocking unit is designed for simultaneously releasing the first door and the second door in a third operating mode, wherein the first access opening and the second access opening completely merge into each other for forming an enlarged access opening. Through the combination of the access openings and the simultaneous operability of the first door and the second door, a kind of corner entry with a clearly increased passage width into the cabin monument may be realized, which particularly allows disabled persons to comfortably enter the cabin monument with a wheelchair.

The door blocking unit may further comprise at least one partition wall, which is selectively positionable in a first position near the first walling, in which the first access opening and the first door are blocked, and in at least one second position, in which the first access opening and the first door are released. Besides the function of a blocking means for the first door, the partition wall may consequently increase the functionality of the arrangement still further. Arranging of a partition wall directly in front of the first access opening or the first door, respectively, leads to preventing an undesired operation of the first door through its full covering in particular during boarding the passenger cabin with person traffic caused thereby. In operating phases of the vehicle, in which all passengers are inside the cabin or during cleaning of the cabin, the partition wall may preferably be positioned in a second position, in which the partition wall comprises a sufficient distance to the first door, such that it remains fully operable. A space region between the first access opening and the partition wall, which is used during boarding and de-boarding, as well as a first access opening arranged behind, is optically shielded through the partition wall. Passengers on passenger seats directly adjacent thereto are not disturbed even with an increased frequency of using the cabin monument.

In a particularly advantageous embodiment, the first walling borders a door region of the cabin, wherein the partition wall is positioned in a position within the door region that releases the first door. A separate, fixedly installed partition wall for separating a passenger seat region from a door region that follows on in a seating or viewing direction, respectively, is not necessary, such that passenger seats facing the door region may be shifted very close to it. Thereby, an enlarged usable area for passenger seats within the cabin results. A passage width usable by passengers in the door region is determined through a clear distance between the passenger seats extending into the door region and the partition wall that blocks the first access opening, when the partition wall is in the first position.

The partition wall may be designed to be position variable through different measures. In a particularly simple variant, the partition wall may be handled manually, e.g., through lifting, carrying and placing, to release it from arresting means in a cabin floor in a certain position and to engage it with arresting means in another position in the cabin floor. Additionally, corresponding arresting means in a ceiling region or wall regions near to the ceiling are conceivable to achieve a rigid holding of the partition wall. In a further developed, more elaborate variant, guiding devices are conceivable, which allow shifting or moving, respectively, of the partition wall with little force, e.g., in form of guiding rails, in which the partition wall is held with variable position. For arrestment in the first or a second position, arresting means are conceivable, which are arranged in the respective positions in the cabin floor as well as in a ceiling region. It suggests itself to arrange the guiding devices particularly in the ceiling region, such that they are protected from dirt. Consequently, the partition wall hangs from the ceiling region and may be shifted along the guiding device through a user once all arresting means are released. Arresting means in the ceiling region may be integrated into the guiding device. For operating the arresting means, operating elements may be provided, which are arranged at or in the partition wall. Besides using a purely mechanical operating kinematics between an operating element and arresting means, also automated or automatic, e.g. electrical, systems for operating the arresting means may be realized. Furthermore, moving the partition wall itself through an active device is realizable, such that, e.g., after completion of a boarding or de-boarding process in the cabin, the partition wall may be moved from a position, in which the first access opening is blocked, into a position, in which the first access opening is released.

In an equally advantageous embodiment, a further cabin monument may be arranged opposite the second walling, such that a separable space region on the second aisle between the cabin monuments is possible as a result. As explained previously, the second access opening as well as the space in the cabin monument itself is only accessible from the second aisle when choosing the second operating mode, since the access through the first access opening is blocked. For example, such a second aisle may lead to a cockpit, such that a vehicle operator is able to use a lavatory in the cabin monument without being disturbed. Two cabin monuments arranged opposite each other may furthermore function as apparatus for separating two cabin sections, which are connected through the blockable second aisle.

In such a constellation the blocking unit particularly advantageously comprises an additional blocking device, which is selectively bringable (movable) from a neutral position into a position, in which the second aisle is blocked. Through blocking the second aisle, an access from the cabin into the second aisle and consequently into the second access opening is prevented. It is conceivable that the second aisle may form a closed compartment, if it is protected from an access at a side opposite to the blocking device.

The blocking device may be connected to the partition wall or may constitute an integral component thereof. The blocking device may be swivable, displaceable, tiltable, rollable or foldable and may be stored in or at the partition wall in a neutral position. Through respective arresting means, which are at least arranged at or in the partition wall, the blocking device may be secured in a neutral position and a blocking position. In case of rollable, foldable and tiltable variants, but also with displaceable blocking devices, additional arresting means may be provided, which are arranged at an opposite side of the aisle, which is to be blocked.

In a particularly preferred embodiment, the blocking device is realized as barrier. In a further development, the barrier is dimensionally stable and is guided displaceably at or in the partition wall. The dimensional stability allows the barrier to be held at one side of the barrier, in order to extend over a certain surface without further support.

At least one element of the first walling, the second walling, an element near the ceiling and an element near the floor comprises means for holding a partition curtain, which may extend between the cabin monument and another furnishing item. Hereby, the second walling may be shielded, such that in addition to the switching between different operating modes, also a spatial separation e.g. of a complete aisle, may be conducted independent from the respective operating mode. A partition curtain may make an aisle region usable for filling of serving trolleys.

An embodiment of the invention further relates to an aircraft having an aircraft fuselage as well as a passenger cabin formed therein, in which the previously illustrated arrangement is present.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Further characteristics, advantages and potential applications of the present invention result from the following description of the exemplary embodiments illustrated in the figures. In this respect, all described and/or graphically illustrated characteristics also form the object of the invention individually and in arbitrary combination regardless of their composition in the individual claims or their references to other claims. Furthermore, identical or similar objects are identified by the same reference symbols in the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
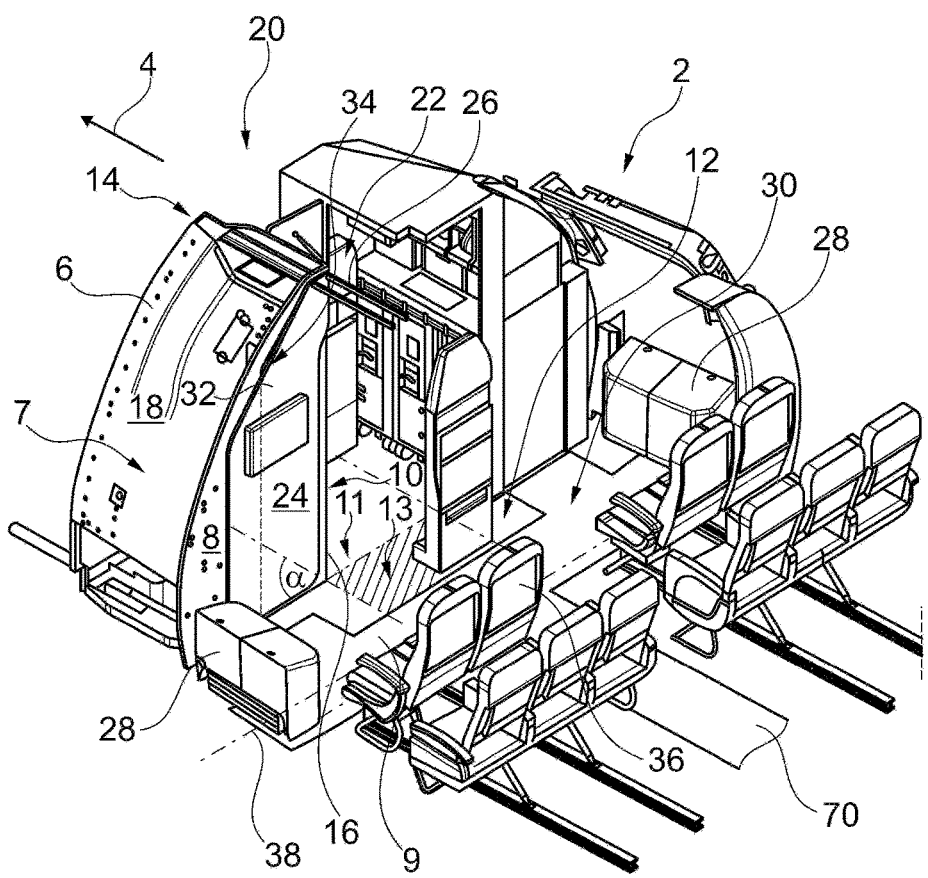
FIG. 1 shows a section from a passenger cabin of an aircraft in a three-dimensional view with a blocked first access opening and a released second access opening.

FIG. 1 shows a section of a passenger cabin 2 of an aircraft in a three-dimensional view, wherein a flight direction 4 is recognizable, which is directed forward for passengers. On a left side of the cabin 2, a first cabin monument 6 is illustrated, which comprises a first walling 8, which borders at a first aisle 9, as well as a second walling 10, which is covered in this view and borders at a second aisle 11 and encloses an angle α of exemplarily 90° with the first walling 8. The first aisle 9 and the second aisle 11 cross each other directly adjacent to the cabin monument 6 and thereby form an intersection 13. Both wallings 8 and 10 extend from a cabin floor 12 to a ceiling region 14 that delimits the passenger cabin 2 in an upward direction, and form a common outer edge 16, which protrudes into the cabin 2 and shows to the intersection 13.

A third, outer walling 18 runs along an edge of the first walling 8 that faces away from the second walling 10 and thereby follows an inner contour of an exemplarily cylindrically shaped aircraft fuselage through creation of a respective curvature, in which aircraft fuselage the passenger cabin 2 is created. It is to be understood that the cabin monument 6 may comprise a further, fourth walling or may be arranged at a walling of an adjacent equipment, such that in the cabin monument 6, a closed space 7 is created.

An arrangement 20 comprising the first cabin monument 6 comprises a blocking unit 22, which comprises a displaceable partition wall 24. Further elements, which fulfil a plurality of functions of the arrangement 20, are shown in further following figures in further detail.

The partition wall 24 is exemplarily displaceably supported along the flight direction 4 by means of two parallelly running rails 26 arranged in the ceiling region 14 above the cabin floor 12. In FIG. 1, the partition wall 24 is positioned in a first position, which is referred to as neutral position in the following and flushly or largely flushly connects to the first walling 8.

In FIG. 1, receptacles 28 that are integrated into a cabin door for receiving of emergency slides are recognizable. In the following the region of the cabin floor 12 between the receptacles 28 is referred to as door region 30, which is entered by passengers particularly during boarding and de-boarding.

In the first walling 8, a first access opening 32 is present, which allows a person to enter the first cabin monument 6 and which is closable by means of a first door 34. In the neutral position of the partition wall 24, the first access opening 32 is covered in such a manner, that opening the first door 34 from the door region 30 is not possible. The blocking unit 22 may consequently block the access through the first access opening 32 by means of the partition wall 24.

By moving the partition wall 24 on the rails 26 it may be brought from the neutral position into the second position, which lies within the door region 30, in such a manner, that the first access opening 32 and the first door 34 are released. The partition wall 24 may be displaced so far to passenger seats 36, which face to the arrangement 20, that between a leading edge 38 of the passenger seats 36 and the partition wall 24, a minimum distance given in certification regulations or requirements of an aircraft operator is met.

Through this design of the arrangement 20, the possibility is given to move passenger seats 36 as close to the door region 30 as possible, such that a space as large as possible for using passenger seats 36 within the passenger cabin 2 is usable. A separate, fixedly installed partition wall between the passenger seats 36 and the door region 30 resultantly is not necessary. For boarding and de-boarding, the partition wall 24 is moved in the neutral position shown here, such that sufficient space for entering the door region 30 exists. During the flight, the door region 30 does not need to be used for boarding and de-boarding, such that a partition wall 24 positioned there before flight does not disturb and the first access opening 32 is accessible.

The first cabin monument 6 may exemplarily comprise a lavatory, which should only be used during cruise flight. Blocking the first access opening 32 through the partition wall 24 therefore is reasonable in order to prevent the use during the boarding and de-boarding process and in order to provide a comfortable and non-constricting entrance.

Blocking the first access opening 32 through the partition wall 24 leads to one or a plurality of operation modes, in which the first access opening 32 remains unusable. In the previous section for the summary of the invention e.g. the second operation mode is mentioned, in which the use of the first access opening 32 is prevented.

Figure 2:
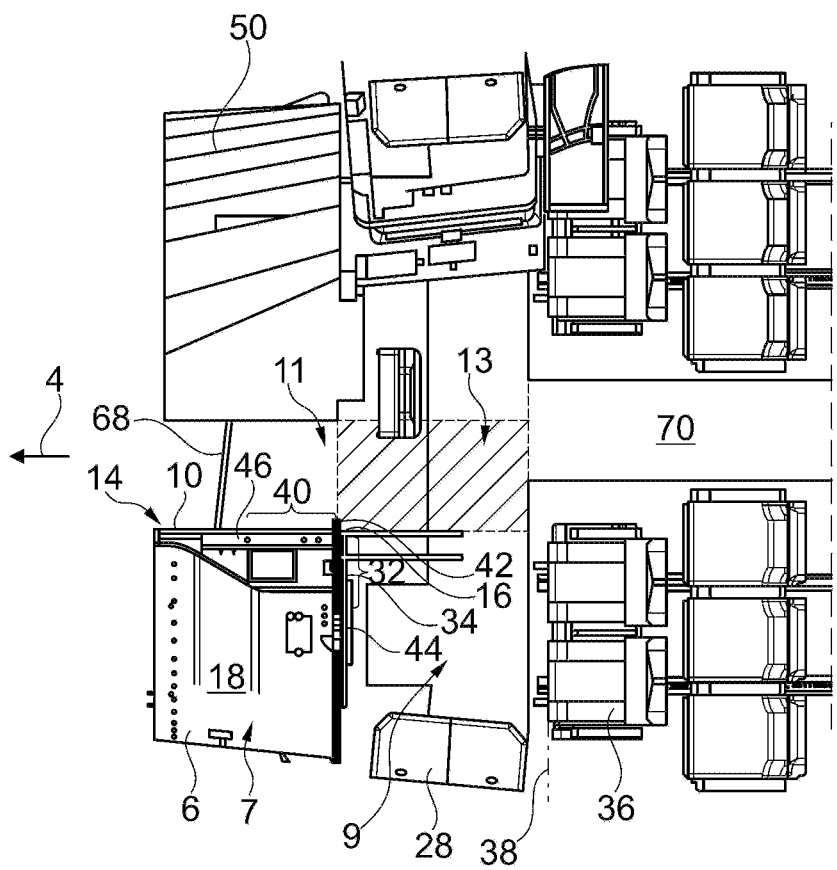
FIG. 2 shows a top view onto the section of the passenger cabin shown in FIG. 1.

FIG. 2 shows a top view onto the section of the passenger cabin 2 shown in FIG. 1. Here, in particular the second walling 10 having a second access opening 40, which is closable through a second door 42, is recognizable. The first door 34 and the second door 42 each are swivably supported on a vertical swivelling axis 44 or 46, respectively, at ends facing away from each other, wherein both doors 34 and 42 exemplarily commonly create the outer edge 16 and provide a corner entry with wider entry opening if opened simultaneously. In the neutral position of the partition wall 24 with unblocked access to the second aisle 11 as well as unblocked second door 42, an access is possible through the second access opening.

An access to the second access opening 40 or the second door 42, respectively, from the door region 30 may be prevented through a further blocking means in form of a curtain 48. For this purpose, the curtain 48 is arranged at a second cabin monument 50, which is adjacent to the second aisle 11 and opposed to the first cabin monument 6. The curtain 48 thereby is exemplarily supportable at a side of the second cabin monument 50 facing away from the first cabin monument 6. In a position, in which the second access opening 40 is blocked, the curtain 48 extends to the outer edge 16 and consequently closes the second aisle 11. Entering the second aisle 11 is therefore impossible, such that this may be used for work tasks at the second cabin monument 50, e.g. for preparing of meals.

Figure 3:
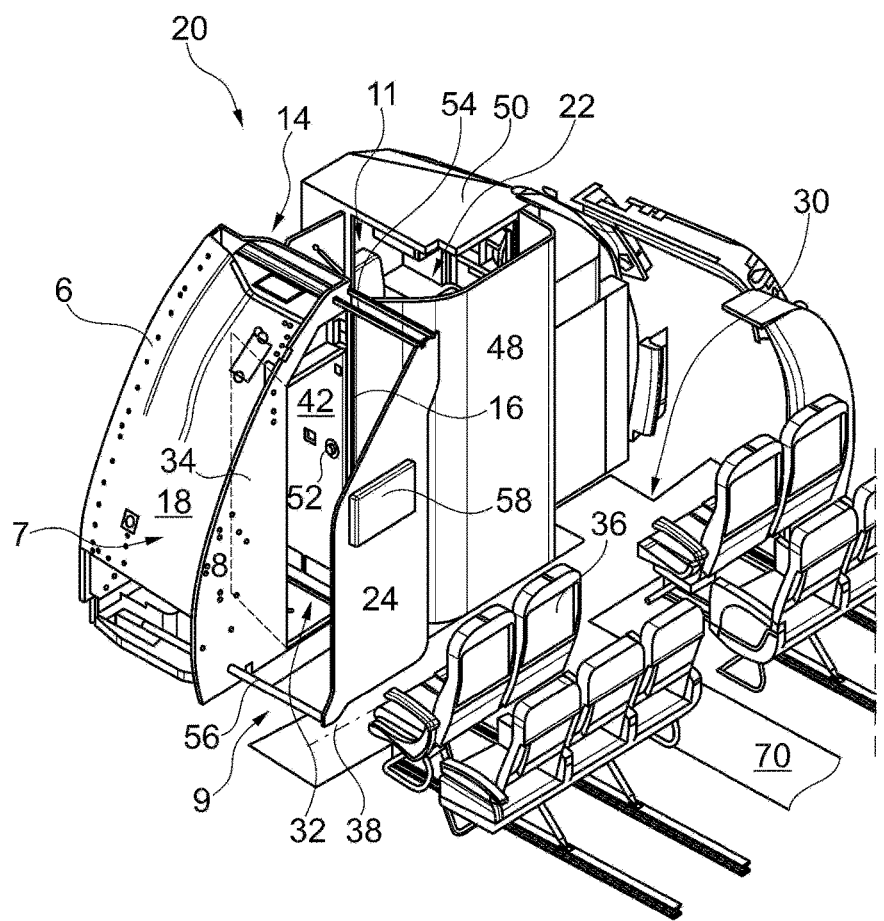
FIG. 3 shows a section of a passenger cabin of an aircraft in a three-dimensional view with a released first access opening and a blocked second access opening.

As furthermore shown in FIG. 3, the partition wall 24 may be distanced from the first walling 8 in such a manner, that the partition wall 24 is placed in the door region 30 and entering the first cabin monument 6 behind the partition wall 24 through the first access opening 32 and the door 34 is allowed. In this context it is reasonable to block the second door 42 through a blocking means, which is exemplarily integrated into a fitting assembly 52, such that a user cannot enter the second aisle after walking through the first access opening 32. As an alternative, separate blocking means, exemplarily in form of a bar 54, are conceivable, which allow a blocking of the second door 42 independently from the fitting assembly 52. The arrangement 20 is illustrated in FIG. 3 in such a manner, that the blocking unit 22 is in a first operation mode. The access to the first access opening 32 is possible in an unrestricted manner, while the access through the second access opening 40 is blocked.

The clear distance between the partition wall 24 and the leading edge 38 of the passenger seats 36 facing the door region 30 hereby conforms the requirements of the aircraft operator or of possible certification regulations, such that passengers on these passenger seats 36 have a sufficient leg room. Since anyway the door region 30 is not usable for boarding and de-boarding during flight, the partition wall 24 does not disturb in this region. As further apparent from FIG. 3, the partition wall 24 may be held by means of an additional rail system 56 in a region near the floor, such that separate fastening means at the cabin floor 12 are not necessary.

For entertaining the passengers on passenger seats 36 facing into the door region 30, the partition wall 24 may carry a screen 58 or other devices, which are supplied through electrical lines in the upper rail 26 or the lower rail 56.

Figure 4:
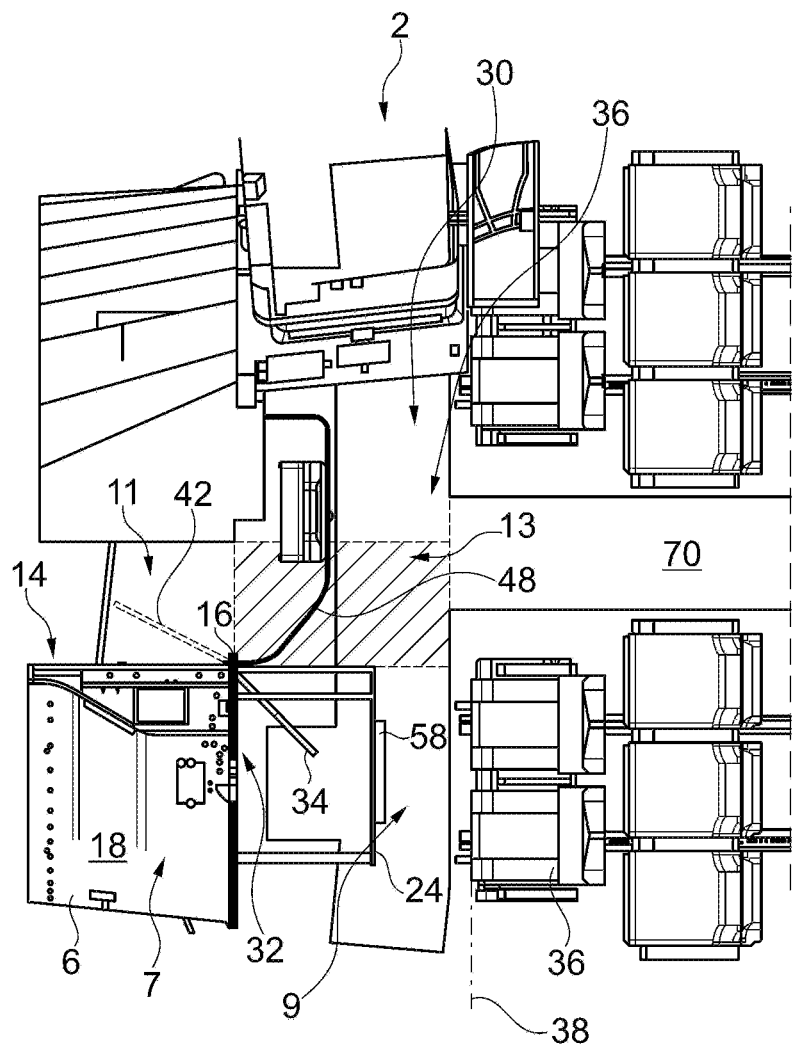
FIG. 4 shows a top view onto the section of the passenger cabin shown in FIG. 3.

FIG. 4 shows the constellation of FIG. 3 in a top view. Exemplarily, the first door 34 is supported at the common outer edge 16 through a hinge, such that an access to the first access opening 32 should be accomplished primarily from a radially outer region of the cabin 2. The outer edge 16 may hereby be designed rigidly and may receive an end of the curtain 58 mechanically simply through suitable means. The second door 42 may, if it is released, be swivelled around the outer edge 16, too.

Figure 5:
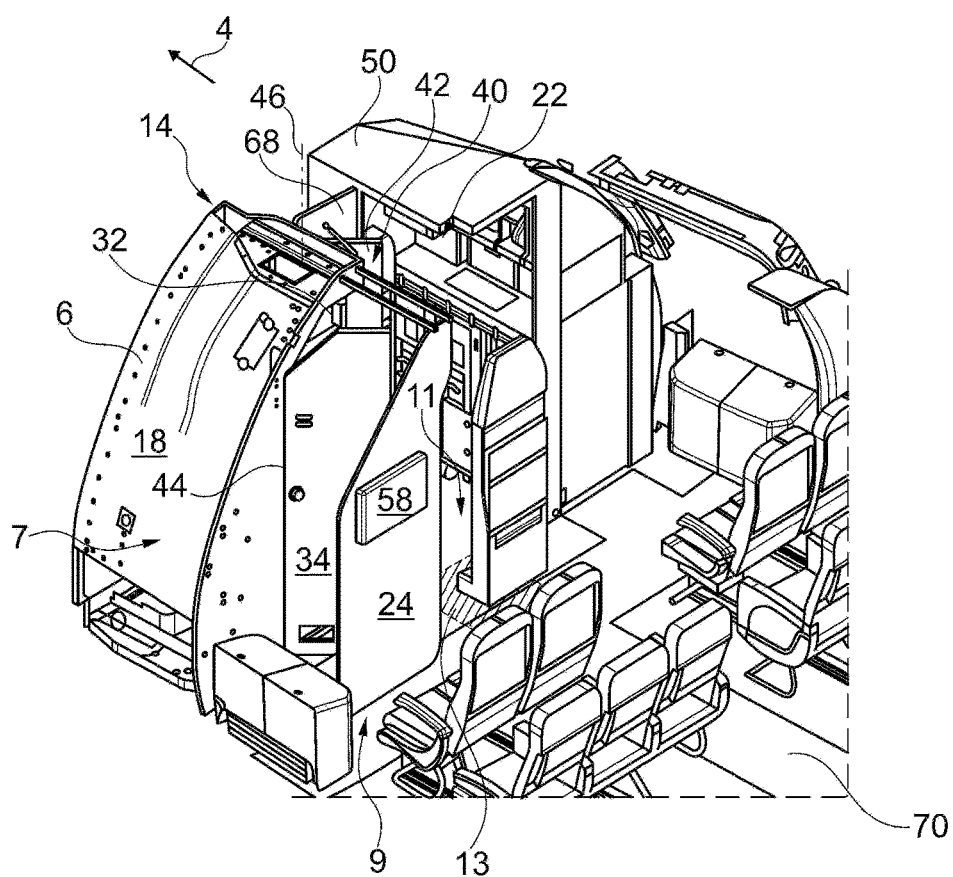
FIG. 5 shows a section of a passenger cabin of an aircraft in a three-dimensional view with a released first access opening, a released second access opening and the simultaneous operation of a first and a second door.

In an alternative variant, the first door 34 and the second door 42 each may be supported around the hinge axis 44 and 46 at ends facing away from each other, such that both, if opened, allow a wider access to the first cabin monument 6. Hereby, it is particularly possible for disabled persons to pass into the first cabin monument 6 by means of a wheelchair. The blocking unit 22 in the case shown in FIG. 5 is in a third operation mode, which allows the access to both access openings 32 and 40.

Figure 6:
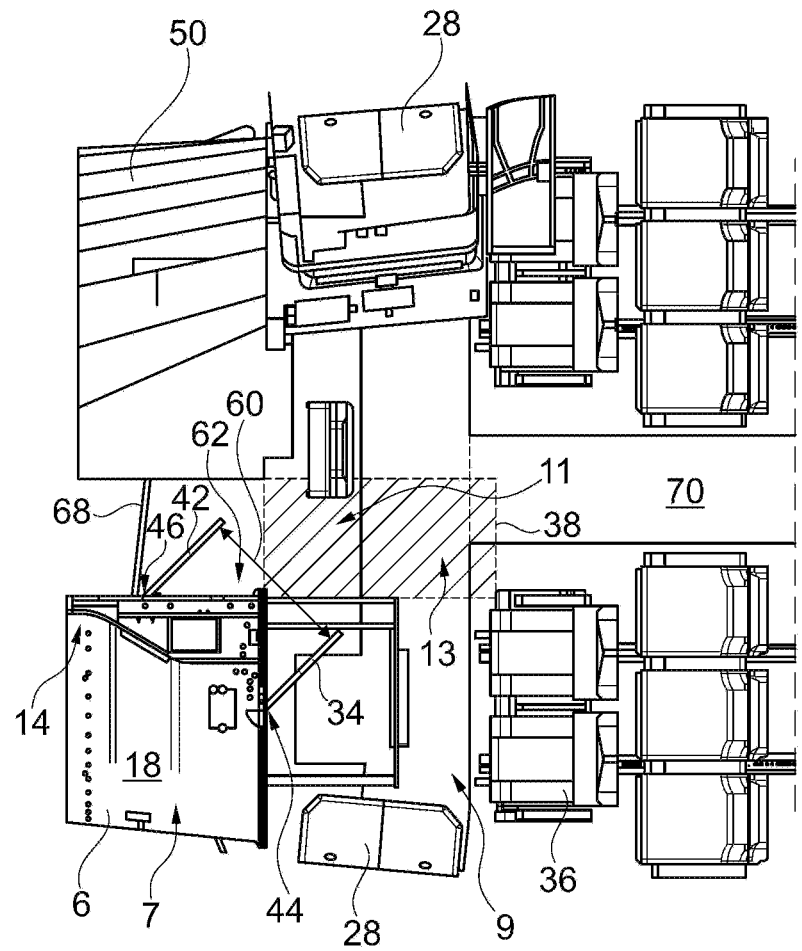
FIG. 6 shows a top view onto the section of the passenger cabin shown in FIG. 5.

As shown in FIG. 6 in a top view, a width 60 of a common access opening 62 is clearly larger than that of the first access opening 32 or of the second access opening 40.

Figure 7:
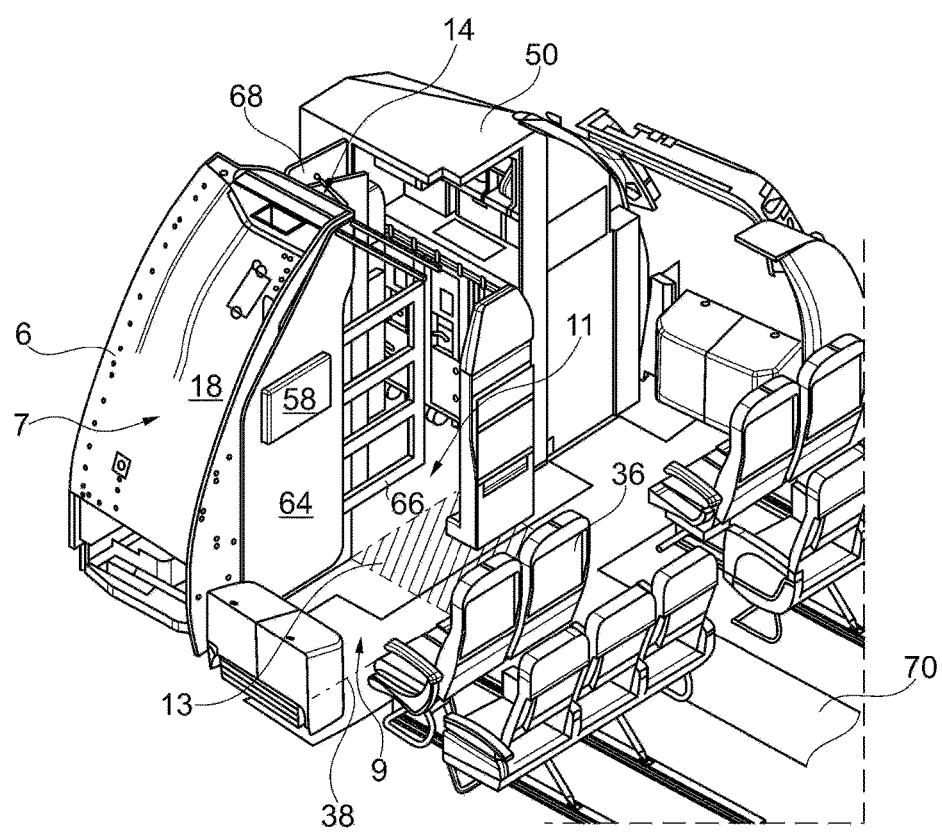
FIG. 7 shows a section of a passenger cabin of an aircraft in a three-dimensional view with a blocked first access opening, a blocked second access opening and a combination of a partition wall and a barrier movably supported thereon as a blocking means.
Figure 8:
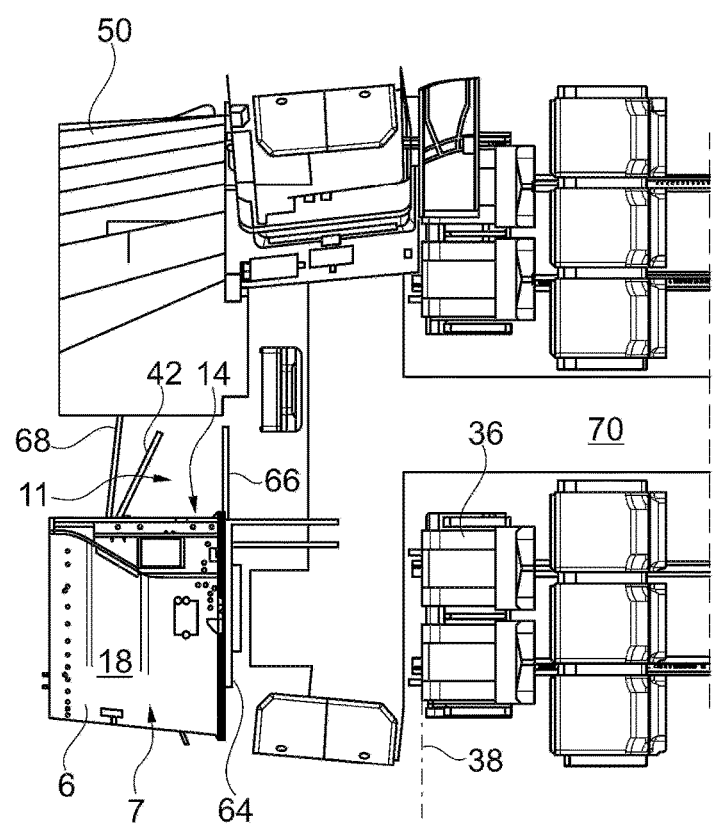
FIG. 8 shows a top view onto the section of the passenger cabin shown in FIG. 7.

FIG. 7 shows a modified embodiment of a partition wall 64 instead of a curtain 48 as a blocking means for blocking the second aisle 11, which has the same features as the partition wall 24 but additionally is equipped with a dimensionally stable barrier 66, which is extendable and retractable parallelly to an extension plane of the partition wall 64. Through extending the barrier 66, the second aisle 11 resultantly may be blocked. As shown in FIG. 8, an unhindered use of the cabin monument 6 through a vehicle operator or other crew members is selectively allowed, if the second door 42 is usable.

As shown in all illustrations, the arrangement 20 may be placed in a forward region facing the nose of the aircraft, wherein a cockpit door 68 between both monuments 6 and 50 are accessible from the cockpit from the second aisle 11. For staying in the cabin monument 6 undisturbedly as well as to prevent entering the second aisle 11 when the cockpit door 68 opens, the barrier 66 may block the access to the second aisle 11, as recognizable in particular in FIG. 8.

As also apparent in all figures, the number of the passenger seats 36 reaching into the door region may be limited to four, which on the one hand facilitates entering the passenger cabin from a cabin door opening as well as entering a center aisle 70.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An arrangement in a cabin of a vehicle, the arrangement comprising:
   a first aisle;
   a second aisle, wherein the second aisle intersects the first aisle at an intersection;
   a cabin monument enclosing a space and having a first wall bordering the first aisle and a second wall bordering the second aisle;

a first access opening arranged in the first wall and in communication with the space;

a second access opening arranged in the second wall and in communication with the space;

a first door arranged in the first access opening and movable between a closed orientation and an open orientation;

a second door arranged in the second access opening and movable between a closed orientation and an open orientation; and a partition wall movable between a blocking configuration and a non-blocking configuration, wherein in the blocking configuration the partition wall is located near the first wall to block access to the first door and the first access opening, and wherein in the non-blocking configuration the partition wall is located at a distance from the first wall to allow access to the first door and the first access opening.

2. The arrangement of claim 1 wherein in the blocking configuration, the partition wall blocks movement of the first door from the closed orientation to the open orientation.

3. The arrangement of claim 1 wherein the partition wall is parallel to the first wall in the blocking configuration and in the non-blocking configuration.

4. The arrangement of claim 1 further comprising a barrier movable between a blocking configuration and a non-blocking configuration, wherein in the blocking configuration the barrier extends across the second aisle to block access to the second access opening from the intersection, and wherein in the non-blocking configuration the barrier does not extend across the second aisle.

5. The arrangement of claim 4 wherein, when the partition wall is in the non-blocking configuration a passageway is formed between the partition wall and the first wall and first access opening, and wherein when the partition wall is in the non-blocking configuration and the barrier is in the blocking configuration a entrance to the passageway is formed between the barrier and the partition wall.

6. The arrangement of claim 5 wherein the arrangement comprises:
a third operating mode in which the partition wall is in the non-blocking configuration, the first access opening is not blocked, the barrier is in the non-blocking configuration, and access to the second access opening from the intersection is not blocked.

7. The arrangement of claim 4 wherein the arrangement comprises:
a first operating mode in which the partition wall is in the non-blocking configuration, the first access opening is not blocked, the barrier is in the blocking configuration, and access to the second access opening from the intersection is blocked; and
a second operating mode in which the partition wall is in the blocking configuration, the first access opening is blocked, the barrier is in the non-blocking configuration, and access to the second access opening from the intersection is not blocked.

8. The arrangement of claim 4 wherein the barrier is stored within the partition wall in the non-blocking configuration.

9. The arrangement of claim 4 wherein the barrier is integral with the partition wall.

10. The arrangement of claim 4 further comprising a fitting assembly in communication with the second door and the second wall to lock the second door in the closed orientation to prevent access to the second aisle from the first aisle through the space.

11. The arrangement of claim 4 further comprising a bar element to lock the second door in the closed orientation to prevent access to the second aisle from the first aisle through the space.

12. The arrangement of claim 4 further comprising a bar element to lock the second door in the closed orientation to prevent access to the second aisle from the first aisle through the space.

13. The arrangement according to claim 12, wherein:
the first door has an outer end adjacent the common outer edge and an inner end;
the inner end of the first door is pivotably mounted at a first vertical axis;
the second door has an outer end adjacent the common outer edge and an inner end; and
the inner end of the second door is pivotably mounted at a second vertical axis.

14. The arrangement of claim 4 wherein the first access opening has a first width, the second access opening has a second width, the first access opening and the second access opening are merged such that when each door is in the respective open orientation, an enlarged access opening is formed and has an enlarged width greater than the first width and the second width.

15. The arrangement of claim 1 further comprising:
a second cabin monument located across the second aisle from the cabin monument; and
a barrier movable between a blocking configuration and a non-blocking configuration, wherein in the blocking configuration the barrier extends across the second aisle to the second cabin monument to block access to the second access opening from the intersection, and wherein in the non-blocking configuration the barrier does not extend across the second aisle.

16. The arrangement of claim 1, wherein each of the first wall and the second wall extend from a region near a floor of the cabin to a ceiling region of the cabin.

17. The arrangement of claim 1, wherein the first wall and the second wall intersect at an angle of less than 180°.

18. The arrangement of claim 1, wherein the first wall and the second wall form a common outer edge.

19. The arrangement of claim 1, further comprising a guiding device, wherein the guiding device supports the partition wall in the non-blocking configuration.

20. An aircraft comprising:
an aircraft fuselage;
a passenger cabin in the aircraft fuselage; and
an arrangement in the passenger cabin, the arrangement comprising:
a first aisle;
a second aisle, wherein the second aisle intersects the first aisle at an intersection;
a cabin monument enclosing a space and having a first wall bordering the first aisle and a second wall bordering the second aisle;
a first access opening arranged in the first wall and in communication with the space;
a second access opening arranged in the second wall and in communication with the space;
a first door arranged in the first access opening and movable between a closed orientation and an open orientation;
a second door arranged in the second access opening and movable between a closed orientation and an open orientation; and
a partition wall movable between a blocking configuration and a non-blocking configuration, wherein in the blocking configuration the partition wall is located near the first wall to block access to the first access opening, and wherein in the non-blocking configuration the partition wall is located at a distance from the first wall to allow access to the first access opening.

* * * * *